United States Patent
Lee

[15] 3,635,147
[45] Jan. 18, 1972

[54] COMBINATION COOKING-STIRRING VESSEL

[72] Inventor: Wallace G. T. Lee, 602 S. W. Park No. 215, Portland, Oreg. 97205

[22] Filed: July 23, 1970

[21] Appl. No.: 57,559

[52] U.S. Cl..................................99/348, 259/44, 259/108, 259/DIG. 18
[51] Int. Cl............................................................A47j 27/02
[58] Field of Search..............259/107, 108, 178 A, DIG. 34, 259/8, 43, 44, DIG. 18; 99/348

[56] References Cited

UNITED STATES PATENTS

| | | | |
|---|---|---|---|
| 683,474 | 10/1901 | Mackinzie | 259/44 |
| 2,553,582 | 5/1951 | Heller | 259/107 |
| 3,168,296 | 2/1965 | Cowley | 259/178 A |
| 2,905,452 | 9/1959 | Appleton | 99/348 |
| 3,220,450 | 11/1965 | Aronson | 99/348 |

Primary Examiner—Robert W. Jenkins
Attorney—Daniel P. Chernoff

[57] ABSTRACT

A vessel for simultaneous cooking and stirring of food ingredients in the form of a bowl provided with an electrical heating element and two sets of stirring blades, one set provided adjacent the wall of the bowl and the other set mounted on a central handle, both sets being rotated by means of a motor drive applied to the rim of the bowl. The bowl is elevated to provide space for the insertion of a plate underneath and is provided with a central hole in the bottom which during the course of the cooking operation is covered by a plug secured to the central handle which may be lifted upward, after the cooking operation is complete, to uncover the opening in the bowl through which the contents can then be pushed out by the stirring action of the blades onto the plate.

14 Claims, 6 Drawing Figures

PATENTED JAN 18 1972

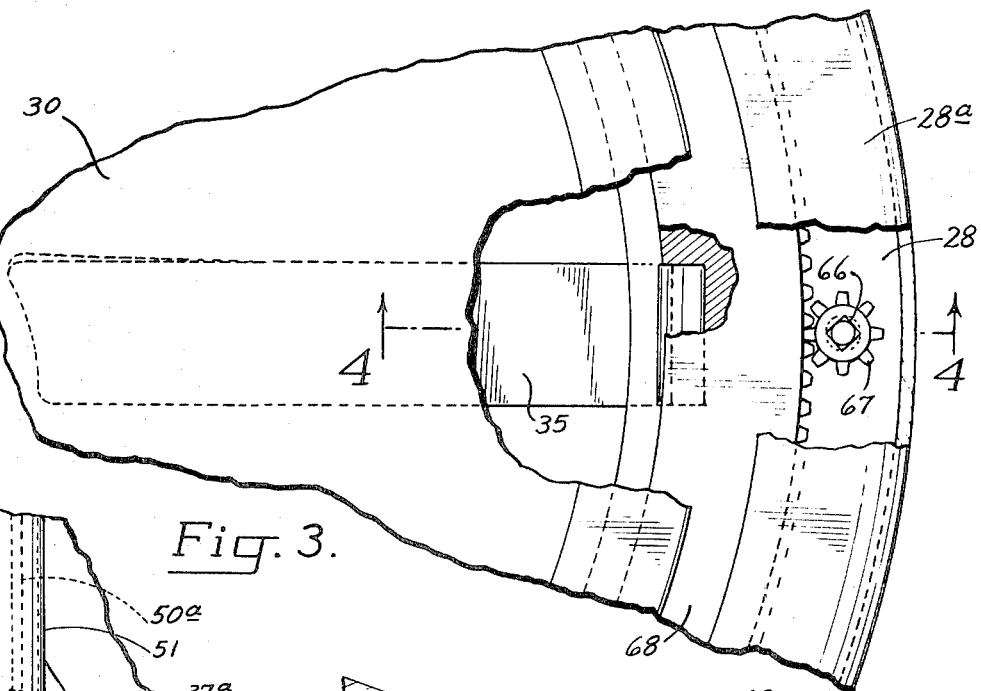
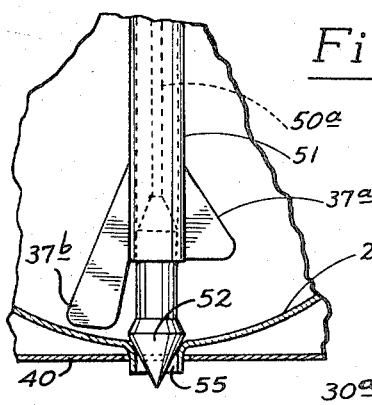
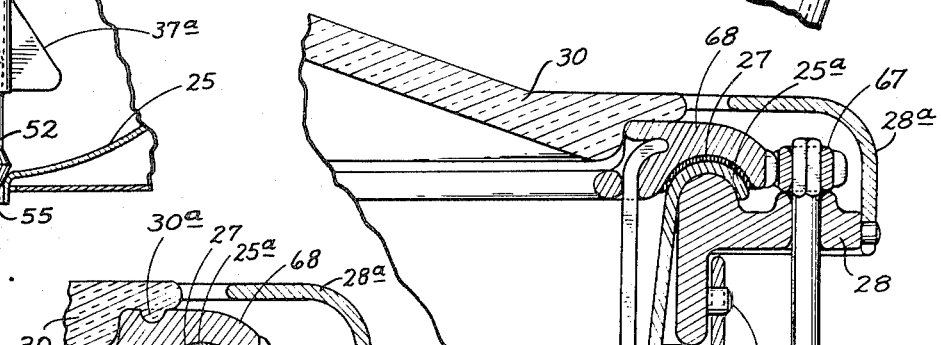
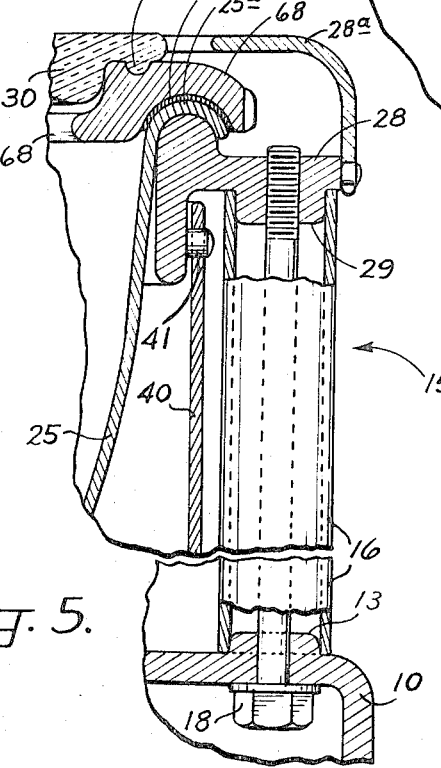
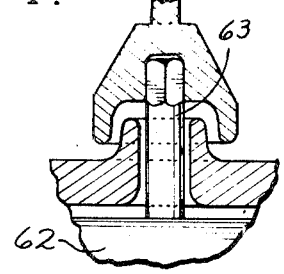

COMBINATION COOKING-STIRRING VESSEL

BACKGROUND OF THE INVENTION

This invention relates to a kitchen appliance and more particularly to a cooking vessel for use in the preparation of chop suey and similar foods requiring combined mixing (but not whipping) and heating of the ingredients.

In traditional cooking of chop suey, as practiced in the better restaurants which strive for authenticity in their food preparation, it is necessary for the vegetables, meat and other ingredients to be mixed constantly during the long (3 to 4 hour) cooking process, and this is now done by hand by kitchen personnel. As can be readily appreciated, the labor costs involved in preparing food in this manner, requiring constant or at least regular mixture of the ingredients over a considerable period of time, is expensive and is rapidly becoming economically prohibitive. Also, because of the constant attention and effort required, it is not feasible for the housewife to prepare Chinese foods at home according to the traditional manner and thus fanciers of Chinese food who desire to have it served at home must either settle for previously prepared food obtained from a restaurant and reheated, or alternatively canned or frozen food, none of which is an altogether satisfactory substitute for freshly prepared chop suey or other Chinese food made in accordance with the traditional manner.

SUMMARY OF THE INVENTION

The present invention is directed to a kitchen appliance, for use in the home as well as in restaurant and institutional facilities, for the preparation of chop suey and other food dishes requiring combined mixing and heating of the ingredients. An illustrative embodiment of the invention incorporates into a compact appliance a cooking bowl or "wok" provided with an electrical heating element and a motor-actuated mixing device which keeps the ingredients constantly in movement during the course of the cooking operation. The wok bowl is provided with a transparent cover for viewing the ingredients during the cooking process and preventing their splattering.

Two sets of stirring blades are mounted inside the wok bowl, one set near the wall of the bowl and the other on a central handle, with both sets of blades rotated by means of a motor-actuated rim drive. The blades are of a special configuration which, in combination with the low speed rotation provided by the rim drive, cause the solid ingredients to mix or interleave in a folding operation, rather than being whipped or blended as in a conventional high-speed mixer.

The wok bowl is elevated above its base support to provide space for the insertion of a plate underneath and is further provided with a central hole in its bottom which during the course of the cooking operation is covered by a plug secured to the central handle whose other end passes through the top of the bowl cover. After the cooking operation is complete, the handle can be lifted upward, without removing the bowl cover, to uncork the plug and uncover the opening through which the contents of the bowl can then be pushed out and emptied, assisted by the stirring action of the blades, onto an underlying dinner plate. For cleaning or repair of the appliance all of its major parts can be readily disassembled.

It is therefore a principal objective of the present invention to provide a new and improved kitchen appliance for the preparation of foods requiring combined mixing and heating of the ingredients.

It is a further objective of the present invention to provide a combination cooking-stirring vessel for preparing foods which can be both filled and emptied in a neat and expeditious manner without requiring lifting or disassembly of the appliance.

It is a principal advantage of the present invention to provide a food vessel having motor-driven means for mixing the ingredients therein in an interleaving or folding fashion, rather than whipping or blending the ingredients, thereby rendering said device especially suitable for the preparation of chop suey, tossed salads and similar foods.

It is a particular feature of the present invention to provide means in a combination cooking-stirring food vessel for emptying its contents through a bottom opening onto an underlying plate or receptacle so that food prepared in the vessel can be neatly and expeditiously removed for serving.

It is a further feature of the present invention to provide a kitchen appliance useful for combination cooking and stirring of food which is of compact design and which can be readily disassembled for cleaning, maintenance and repair.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 3 is a detail sectional view sowing the construction of the motor rim drive.

FIG. 4 is a sectional view taken along the line 4—4 in FIG. 3.

FIG. 5 is a detail sectional view taken along the line 5—5 in FIG. 1.

FIG. 6 is a detail sectional view taken along the line 6—6 in FIG. 2.

DESCRIPTION OF THE PREFERRED EMBODIMENT

Figure 1:
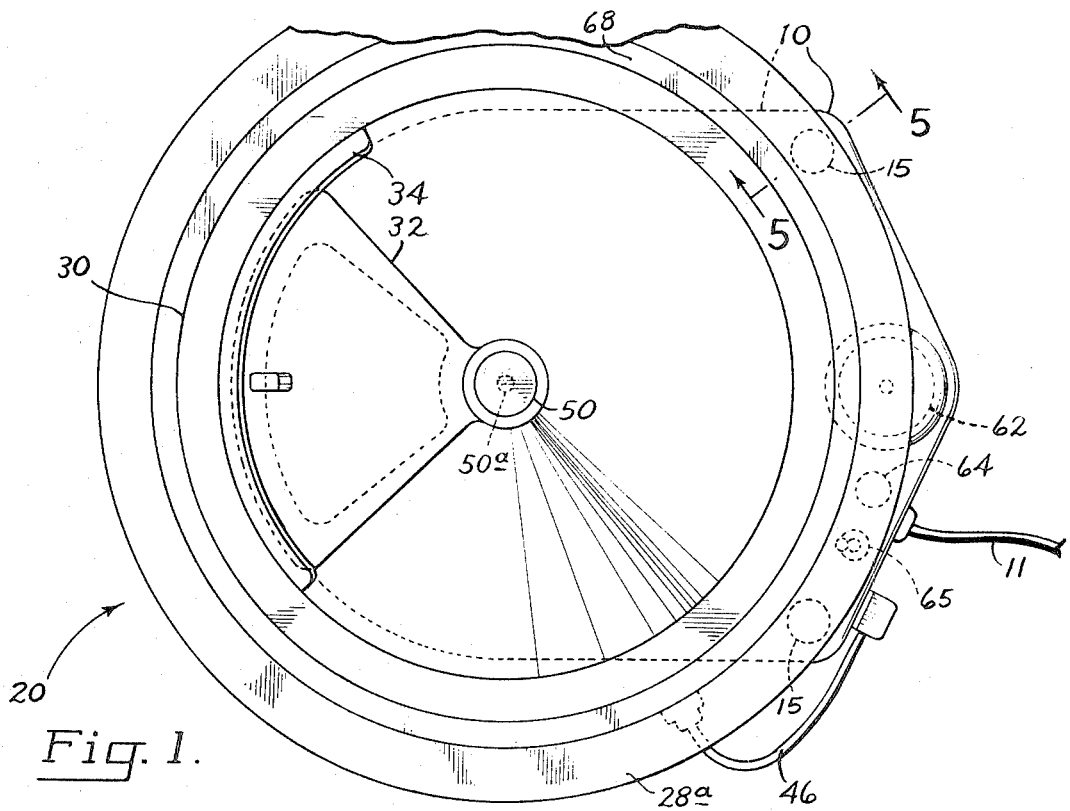
FIG. 1 is a top plan view of an illustrative embodiment of the kitchen appliance of the present invention.
Figure 2:
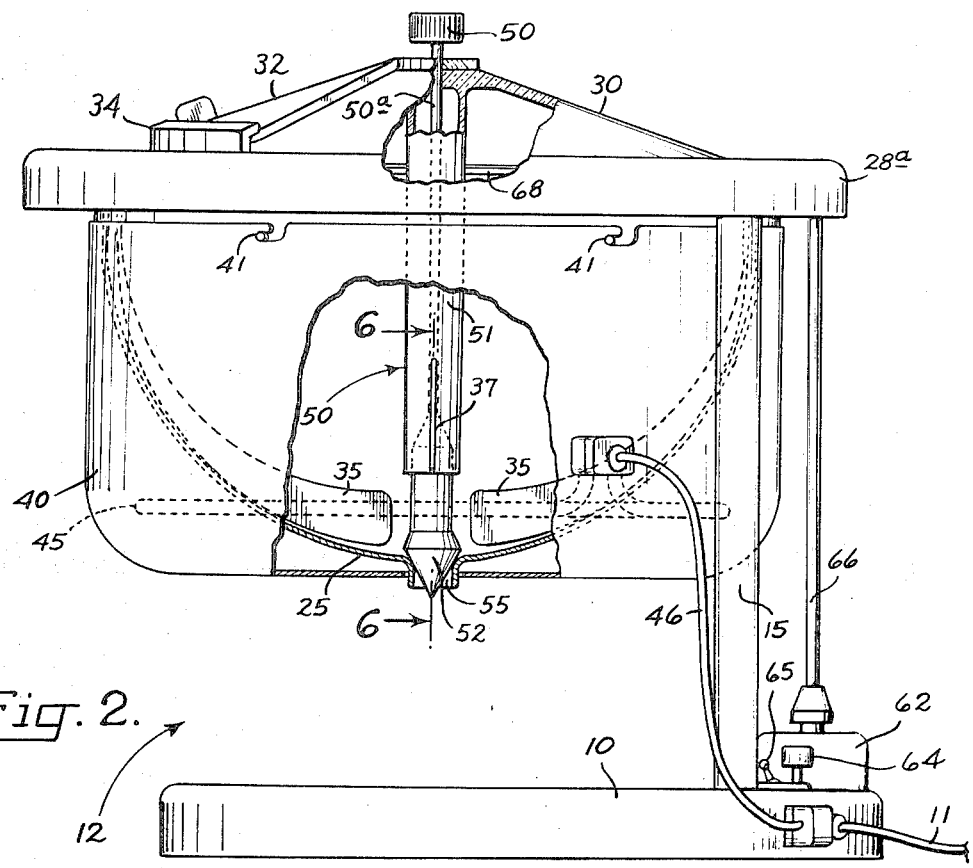
FIG. 2 is a front elevational view of the appliance, partly broken away in section.

Referring to the drawings, a combination cooking-stirring appliance for preparing foods is comprised of a base member 10 above which the body of the food vessel 20 is supported by a pair of posts 15 at a height adequate to provide clearance for the insertion of a dinner plate beneath the bottom of the vessel to receive its contents after the process of preparation is complete. The major components of the cooking vessel comprise: a wok bowl 25 of generally concave configuration; a transparent bowl cover 30; two sets of stirring blades 35, 37 positioned respectively near the wall and near the bottom of the bowl; heater element 45; a reflector housing 40 enclosing the outside of the bowl and the heater element; a handle 50 for opening and closing a central hole 55 formed in the bottom of the vessel; and a motorized rim drive 60 for rotating the stirring blades 35, 37.

Referring now more particularly to the details of the individual components constituting the appliance, the base 10, which preferably should be of sufficient size and weight to provide a firm and stable footing for the appliance, is provided with a powerline cord 11 for connection to a source of electrical potential for energizing the electrical heating element 45 via conductor 46 and for energizing the electrical motor 62 whose speed of rotation is controlled by the setting of a knob 64 acting on a speed control device such as an SCR element (not shown). Switch 65 selectively controls the energization of the motor and the heater element and permits the appliance, when desired, to be used independently of the cooking function for mixing ingredients such as tossed salad.

The vessel proper is supported above the base, in order to provide space 12 beneath the vessel for insertion of a plate, by a pair of posts 15 which exemplarily may be of the construction shown in FIG. 5 so as to permit ready dismantling of the appliance for shipping and storage. Each of the support posts comprises a tubular cylinder 16 connecting at its respective ends to the base member 10 and a flange member 28 ringing the perimeter of the vessel 25. The ends of the tubular element 16 fit over respective mounting bosses 13 and 29 formed on the base and flange member and the support post assembly is held together by a threaded fastener bolt 18. The flange member 28 is surmounted by a peripheral shielding ring 28a attached thereto.

The shaft 63 of the motor is coupled to an extension shaft 66 which is fitted at its other end with a small spur gear 67. This gear meshes with the teeth provided on a ring gear 68 slideably supported for rotation on the peripheral lip 25a of the wok by a liner 27 of Teflon (polytetrafluoroethylene) or other low-friction material. The set of outer blades 35 is attached directly to the ring gear 68 and the inner blade set 37 is also coupled thereto (as will hereinafter be described) so that both inner and outer blade sets are rotated inside the wok bowl by the motor rim drive. By virtue of the large diameter of the ring gear 68 in contrast to the small diameter of the spur gear 67, a substantial speed reduction is effected and the two sets of blades rotate at relatively low speed relative to the speed of the motor shaft 63.

The outer blade set 35 is comprised of a pair of spring fingers diametrically opposed form each other and each secured at one end to the ring gear 68 and extending downwardly along the bowl wall terminating near the bottom, with the respective blade edges spaced apart a distance sufficient to provide clearance for the central handle assembly. The handle assembly 50 comprises a tubular member 51 extending vertically downwardly from the bowl cover 30 and enclosing inside a handle rod 50a whose bottom end terminates in a plug 52 for closing the hole 55 in the bottom of the bowl. The upper end of the handle rod extends through an opening in the center of the bowl cover 30 and is capped with a knob. The aforedescribed arrangement enables the hole in the bowl bottom to be uncovered after the cooking-stirring process is complete without need for removing the bowl cover by merely pulling the handle upward by its know portion.

Mounted on the lower portion of the tubular member 51 and projecting radially therefrom is the set of inner stirring blades 37. The inner blade set, as shown in the detail view of FIG. 6, is in the form of a pair of downwardly extending fins 37a, 37b, with one of the fin blades 37a foreshortened so as to provide clearance for the ingredients to be pushed out through the bottom opening 55 when the plug 52 is retracted upward. The inner set of blades 37 mounted on the tube member 51 is coupled for rotation to the ring gear 68 by means of the bowl cover 30 which is detachably connected to the ring gear by detents 30a so that the whole cover assembly rotates with the gear. The set of inner blades 37 is preferably offset 90° from the outer set of blades 35 so as to obtain a more uniform and complete stirring action. The provision of the inner blade pair 37, and especially the long blade 37b which extends to quite near the bottom of the bowl, ensures that the heavier food constituents which tend to congregate in the bottom of the bowl will be thoroughly intermixed.

The housing 40, which encloses the heater element and the wok bowl and is releasably secured to the flange member 28 by bayonet-type locking fasteners 41, preferably has a reflective interior provided by a metallized layer and an insulating body portion of plastic or other suitable material so as to concentrate the heat generation inside the cooking vessel with the minimum heat leakage to the outside and at the same time maintaining the exterior of the appliance cool.

To provide access to the interior of the bowl 25, when filling it with the ingredients, the cover member 30 is provided with a slideable sectorlike lid 32 which is pivotable about the handle rod 50a and retained in place by a raised arcuate channel portion 34 formed out of the bowl cover.

When the cooking operation is completed, retraction of the handle rod 50a uncovers the hole 55 and permits the food to be completely emptied out, assisted by the stirring action of the blade sets 35, 37, onto a serving plate inserted underneath. In this manner the cooking vessel can be emptied in a highly satisfactory and expedient manner as the sauces and other liquids do not have an opportunity to run off or congregate as when a vessel is emptied from its top in the conventional fashion.

The terms and expressions which have been employed in the foregoing abstract and specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What is claimed is:

1. A kitchen appliance used for the preparation of foods comprising: base member, a bowl, support means maintaining said bowl in a horizontal position spaced above said base member with clearance sufficient to permit the insertion of a plate beneath the bottom of said bowl and said base member, an opening in the bottom of said bowl for emptying out the contents thereof, power-driven stirring means for mixing the contents of said bowl, and an elongated vertically extending handle member having one end terminating in a plug for closing said bowl opening and a manipulation end projecting above the rim of said bowl, said handle member being vertically movable independently of said stirring means from a rest position in which said opening is closed to a raised position unplugging said opening for the emptying out of said contents from said bowl.

2. The kitchen appliance of claim 1 further including a cover for said bowl with an opening therein through which said handle member passes so that the manipulation end of said handle is above said cover.

3. The kitchen appliance of claim 1 further including a heating element proximate said bowl for cooking the contents thereof.

4. The kitchen appliance of claim 3 wherein said heater element is enclosed within a reflector housing for minimizing heat leakage and for heat shielding purposes and said reflector housing is similarly provided with an opening in its bottom in cooperative relationship with said bowl opening.

5. The kitchen appliance of claim 1 further including motor-driven stirring means for mixing the contents in said bowl.

6. The kitchen appliance of claim 5 wherein said stirring means comprises at least one outer blade member rotating about the axis of said bowl and positioned adjacent a substantial length of the wall thereof and at least one inner blade member rotating about said blade axis and positioned adjacent the center of said bowl.

7. The kitchen appliance of claim 6 wherein said inner and outer blade members are coupled so as to be driven by the same motor drive and maintain in rotation a fixed angular relationship with each other.

8. The kitchen appliance of claim 6 wherein the motor for said stirring means is located on said base member beneath said bowl and its shaft is extended to drive a ring gear mounted for rotation on the rim of said bowl and connecting to said inner and outer blade members.

9. The kitchen appliance of claim 5 wherein the motor for driving said stirring means is located on said base member beneath said bowl.

10. The kitchen appliance of claim 1 further including motor-driven stirring means for mixing the contents inside said bowl and a heater element in proximate relation to said bowl for cooking said contents.

11. The kitchen appliance of claim 1 wherein said handle member is in the form of a vertically extending rod positioned substantially along the axis of said bowl.

12. A kitchen appliance used for the preparation of foods comprising: a bowl, base support means for maintaining said bowl in a horizontal stationary position, stirring means for mixing the contents in said bowl, said stirring means comprising a first blade member rotating about the axis of said bowl and positioned adjacent a substantial length of a wall thereof and a second, inner blade member rotating about the axis of said bowl in a position closely adjacent the center thereof, and a motor located on said base support member and having its shaft driving a ring gear mounted for rotation on the rim of said bowl and connecting to said stirring means.

13. The kitchen appliance of claim 1 further including an opening in the bottom of said bowl for emptying out the contents thereof and an elongated handle member having one end terminating in a plug for closing said bowl opening and a manipulation end projecting outside said bowl.

14. The kitchen appliance of claim 13 wherein said handle member is in the form of a vertically extending rod positioned substantially along the axis of said bowl and projecting above the rim thereof.

* * * * *

UNITED STATES PATENT OFFICE
CERTIFICATE OF CORRECTION

Patent No. 3,635,147            Dated February 22, 1972

Inventor(s) WALLACE G. T. LEE

It is certified that error appears in the above-identified patent and that said Letters Patent are hereby corrected as shown below:

Col. 2, Line 22    Change "sowing" to --showing--.

Col. 3, Line 31    Change "know" to --knob--.

Col. 4, Line 7     Before "base" insert --a--.

Line 73    Change dependency of claim 13 from claim 1 to claim 12.

Signed and sealed this 6th day of June 1972.

(SEAL)
Attest:

EDWARD M. FLETCHER, JR.           ROBERT GOTTSCHALK
Attesting Officer                  Commissioner of Patents